United States Patent
Verslegers et al.

(10) Patent No.: US 8,760,600 B2
(45) Date of Patent: Jun. 24, 2014

(54) AREA ACTIVE BACKLIGHT WITH SPATIOTEMPORAL BACKLIGHT

(75) Inventors: Lieven Verslegers, La Jolla, CA (US); Xiao-fan Feng, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 62 days.

(21) Appl. No.: 13/284,486

(22) Filed: Oct. 28, 2011

(65) Prior Publication Data
US 2013/0107164 A1    May 2, 2013

(51) Int. Cl.
*G02F 1/1335*    (2006.01)

(52) U.S. Cl.
USPC .................... 349/61; 349/62; 349/64; 349/65

(58) Field of Classification Search
None
See application file for complete search history.

(56) References Cited

U.S. PATENT DOCUMENTS

| | | | |
|---|---|---|---|
| 4,234,245 A | 11/1980 | Toda et al. | |
| 4,794,370 A | 12/1988 | Simpson et al. | |
| 4,807,967 A | 2/1989 | Veenvliet et al. | |
| 5,319,491 A | 6/1994 | Selbrede | |
| 5,828,431 A | 10/1998 | Ando et al. | |
| 7,430,355 B2 | 9/2008 | Heikenfeld et al. | |
| 7,592,988 B2 | 9/2009 | Katase | |
| 2002/0167624 A1* | 11/2002 | Paolini et al. | 349/61 |
| 2008/0074370 A1* | 3/2008 | Huang et al. | 345/88 |
| 2008/0212158 A1 | 9/2008 | Van Ostrand | |
| 2009/0096729 A1* | 4/2009 | Ozawa et al. | 345/87 |
| 2010/0188602 A1* | 7/2010 | Feng | 349/62 |
| 2010/0253696 A1* | 10/2010 | Choi | 349/65 |

* cited by examiner

*Primary Examiner* — Bumsuk Won
*Assistant Examiner* — Ryan Crockett
(74) *Attorney, Agent, or Firm* — Chernoff Vilhauer McClung & Stenzel, LLP

(57) ABSTRACT

A liquid crystal display includes a backlight that provides light and selectively modifies the transmission of light from the backlight to the front of the display. The backlight includes a plurality of spaced apart light waveguides and a plurality of selection elements associated with the light waveguides that change the characteristics of the material of the light waveguides to selectively direct the transmission of light toward the liquid crystal layer. The combination of the waveguides and the selection elements provide light to the front of the display in a non-uniform temporal manner and a non-uniform spatial manner during a frame.

18 Claims, 16 Drawing Sheets

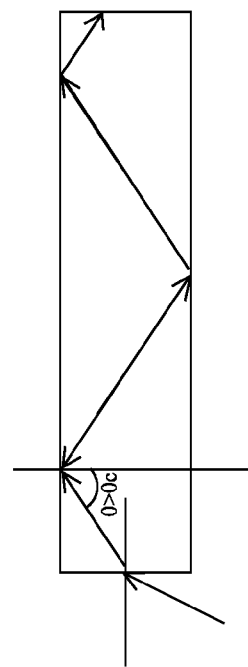
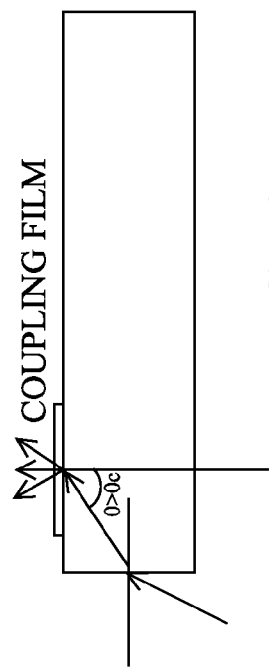
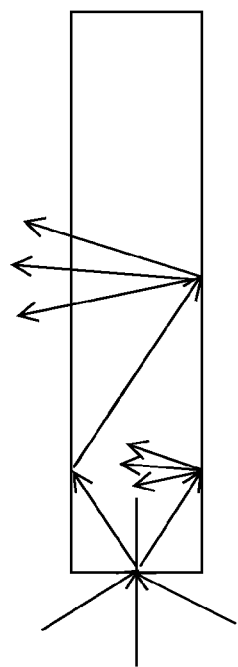
FIG. 5
FIG. 6
FIG. 7

Backlight goal and position

AREA ACTIVE BACKLIGHT WITH SPATIOTEMPORAL BACKLIGHT

CROSS-REFERENCE TO RELATED APPLICATIONS

Not applicable.

BACKGROUND OF THE INVENTION

The present invention relates to a liquid crystal panel, and in particular to a liquid crystal panel with a spatiotemporal light source.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed while it transits the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series of polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

Referring to FIG. 1, a liquid crystal display (LCD) 50 (indicated by a bracket) comprises, a backlight 52 and a light valve 54 (indicated by a bracket). Since liquid crystals do not emit light, most LCD panels are backlit with fluorescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 comprises a pair of polarizers 60 and 62 separated by a layer of liquid crystals 64 contained in a cell gap between the polarizers. Light from the backlight 52 impinging on the first polarizer 62 comprises electromagnetic waves vibrating in a plurality of planes. Only that portion of the light vibrating in the plane of the optical axis of a polarizer can pass through the polarizer. In an LCD light valve, the optical axes of the first 62 and second 60 polarizers are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizers, permitting light to pass through the light valve creating a bright picture element or pixel, or out of alignment with the optical axis of one of the polarizers, attenuating the light and creating a darker area of the screen or pixel.

The surfaces of a first glass plate 63 and a second glass plate 61 form the walls of the cell gap and are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel. A set of color filters 84, and a polarizer 82 arranged in front of the touch screen can significantly reduce the reflection of ambient light, also a cover plate 86 may be placed over the polarizer 82.

The aforementioned example was described with respect to a twisted nematic device. However, this description is only an example and other devices may likewise be used, including, but not limited to, multi-domain vertical alignment (MVA), patterned vertical alignment (PVA), in-plane switching (IPS), and super-twisted nematic (STN) type LCDs.

FIG. 2 illustrates a typical liquid crystal display 100 (i.e., LCD) with a side-lit cold cathode florescent light (i.e., CCFL) backlight lamp 110. The light from the CCFL lamp 110 may be coupled into an optical waveguide 120. The emitted light is primarily confined in the optical waveguide 120 via total internal reflection (TIR) and scattering from the bottom surface 130 of the optical waveguide 120 causes the light that has a scattered angle less than the critical angle to pass through the front of the optical waveguide 120 and distribute generally uniformly across the display. Unfortunately, the light provided by the backlight 110 can not be selectively controlled to different regions of the display.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 illustrates TIR in a waveguide.
FIG. 6 illustrates FTIR in a waveguide.
FIG. 7 illustrates a selectable FTIR waveguide.

DETAILED DESCRIPTION OF PREFERRED EMBODIMENT

It is desirable to include an active backlight which selectively provides light to different regions of the display. Such regions of the display may be as small as a pixel, or sub-pixel, or a fraction of a sub-pixel, but in general are significantly larger than a pixel and are preferably patterned so that it produces uniform light output for uniform input. In addition, being able to selectively reduce the backlight in different regions of the display also decreases the overall power consumption of the display.

A display may include a series (or plurality) of single light emitting diodes arranged in a parallel fashion along the edge of the display, or other light sources, each of which provides illumination to a one-dimensional striped region across the display. The light sources may likewise be arranged to illuminate regions of the display in any other manner. Collectively, the one-dimensional illuminated regions illuminate the entire display. In relation to a two-dimensional array of light emitting diodes, the one-dimensional array of light emitting diodes results in a lower cost for the display, but fails to include the illumination selectivity capable with the two-dimensional array.

Two dimensional array capabilities with a one dimensional array are achievable by using an optical waveguide together with a temporal based illumination technique for different regions of the display. This combination achieves both the selectivity of the two-dimensional array together with the low cost and power reduction of a one-dimensional array. Moreover, a spatially temporal illumination of pixels may also be used to reduce image blur when displaying moving objects. The light waveguide may be any type of structure that directs or otherwise supports the passage of light from one location to another.

Figure 3:
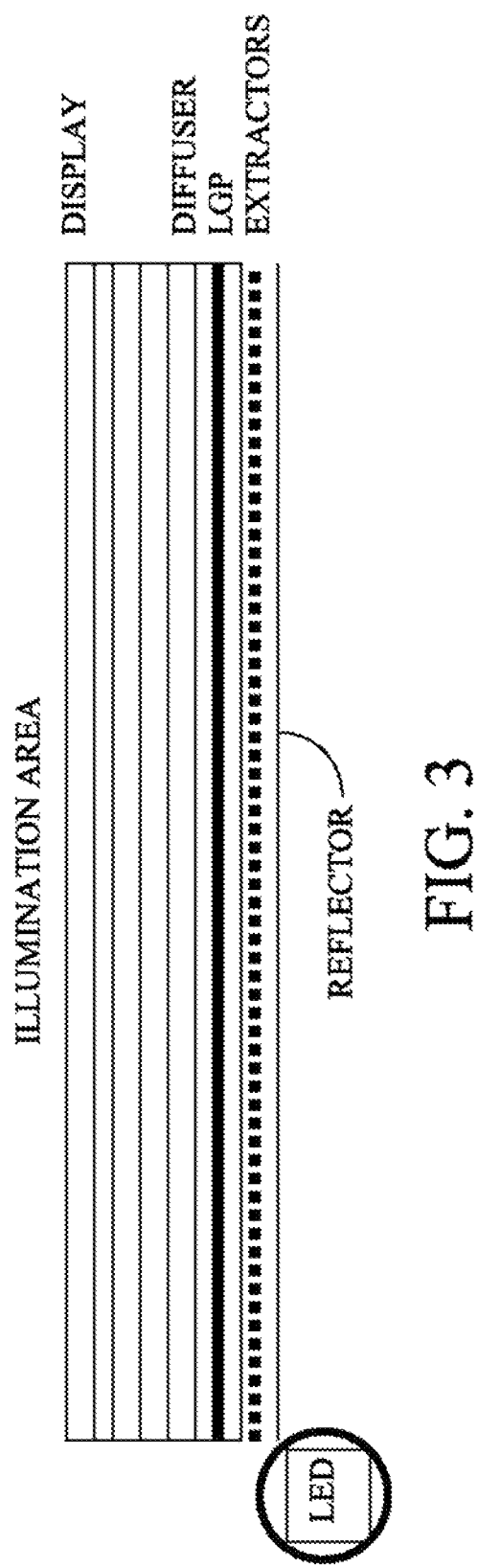
FIG. 3 illustrates a liquid crystal display with an optical waveguide.

FIG. 3 illustrates a backlight that includes an LED light source. Light from the LED is coupled into the waveguide and a light extractor is employed to distribute light uniformly across the screen.

Figure 4:
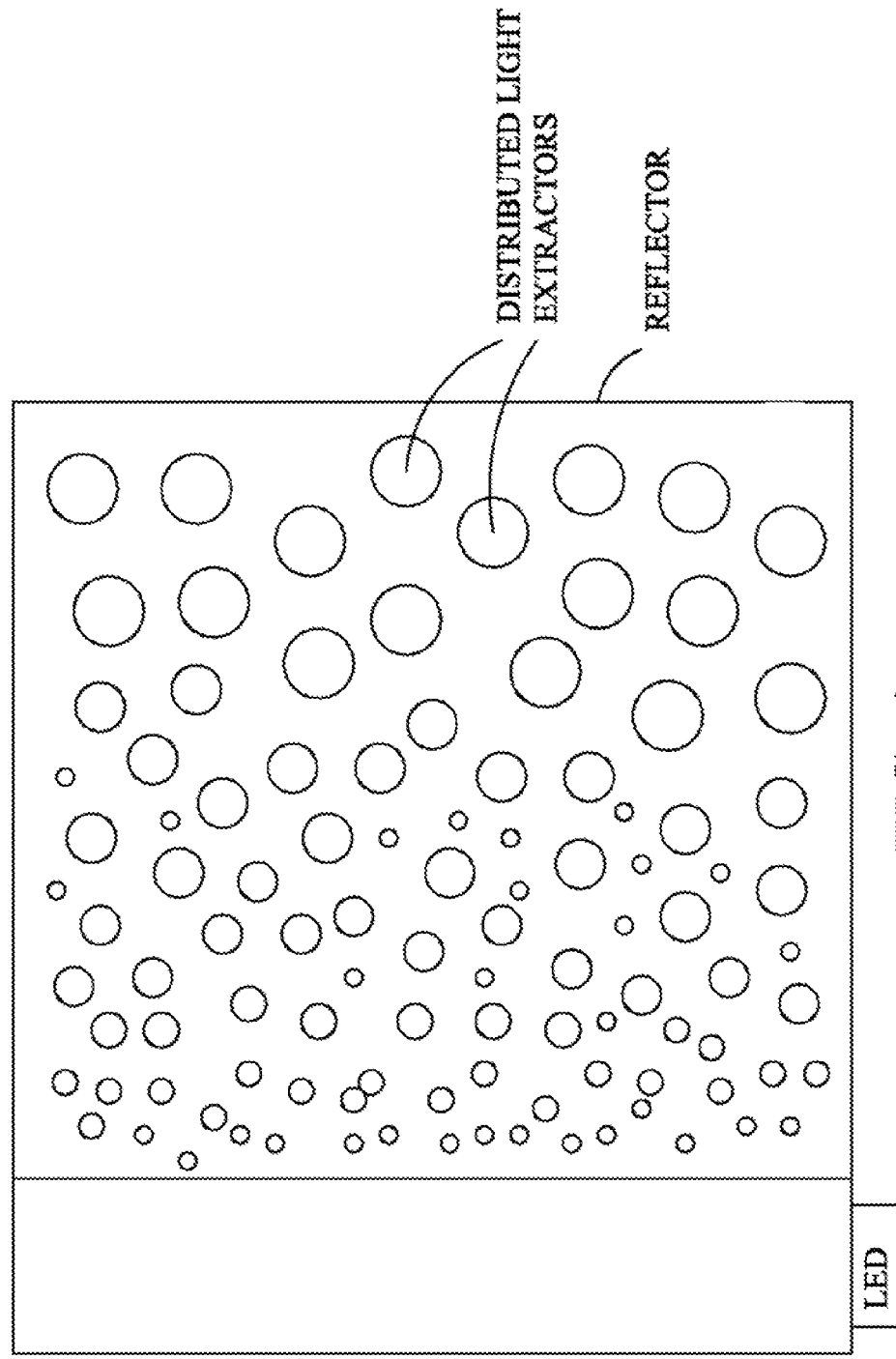
FIG. 4 illustrates a light extractor for a light emitting diode backlight.

FIG. 4 illustrates the light extractor of FIG. 3. The circles in the figures indicate the areas that no longer satisfy the TIR condition and accordingly distribute the light into the LCD across the display. The area and distribution of these extractors are arranged to achieve a generally uniform backlight.

Figure 1:
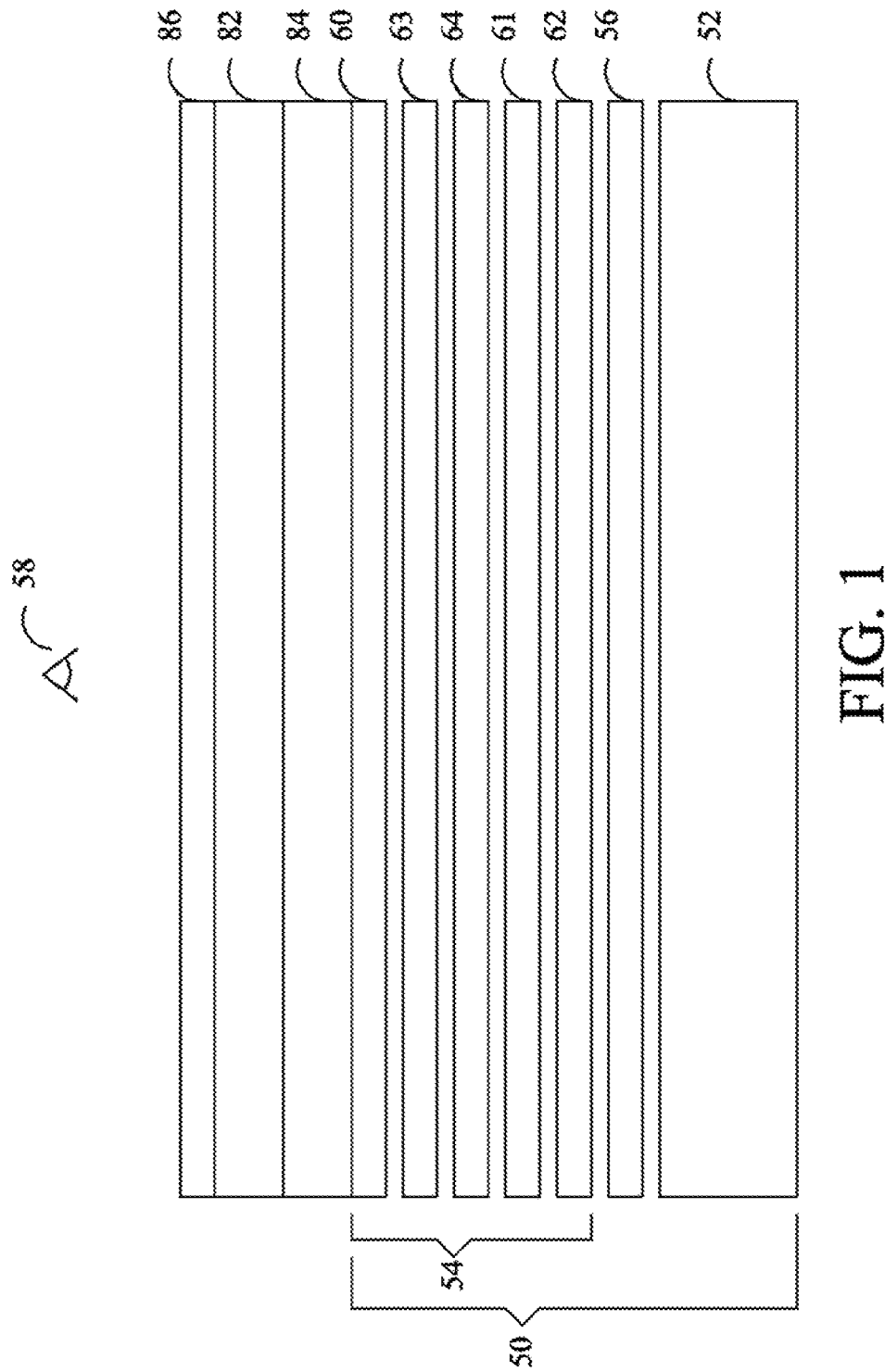
FIG. 1 illustrates a liquid crystal display.
Figure 2:
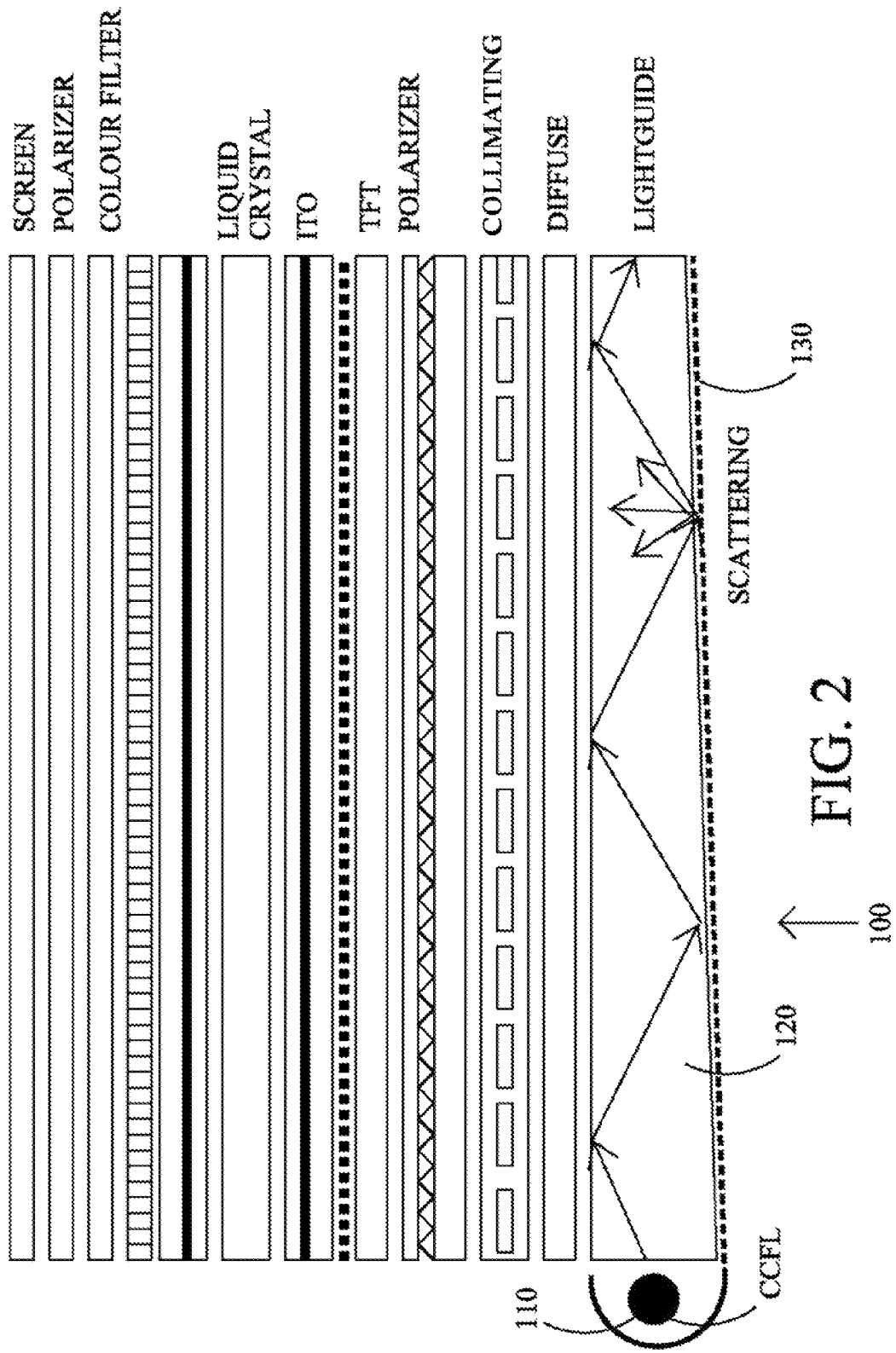
FIG. 2 illustrates a liquid crystal display with a side lit backlight.

In the backlight configurations illustrated in FIGS. 2, 3, and 4, the total internal reflection is used to guide the light from a light source such as CCFL, LED, or laser to the front of the display. Referring to FIG. 5, a TIR waveguide is illustrated. The TIR light guide may be made from a transparent polymer with a refractive index of 1.50 giving a critical angle of 41.8°. The light generated from LEDs enters the light guide; the angular distribution of rays is bound within $\pm\theta_c$. According to Snell's Law, all rays striking the interior wall at angles greater than $\theta_c$ will be totally internally reflected and will travel along the light guide. This means that all beams incident on the input face of the guide are guided.

There are many ways to extract the light from the waveguide. One way to extract light is to using scattering to change the direction of the light ray such that the incident angle is less than the critical angle $\theta_c$. Another way to extract light is to have another material of a higher, lower, or the same refractive index at a very close proximity (such as within a few wavelengths) of the waveguide so that the evanescent wave from the TIR couples to the new material (evanescent wave coupling). The evanescent wave coupling causes a frustrated total internal reflection (FTIR) which results in the extraction of light from the waveguide. FIG. 6 illustrates frustrated total internal reflection in an optical waveguide. The light can thus be selectively extracted from an optical waveguide at desirable locations.

A preferred technique for constructing a display that incorporates FTIR is to use one or more light guides at angles that maximize the total internal reflection (or otherwise have significant TIR) to reduce light from escaping the backlight. Referring to FIG. 7, a polymer-dispersed liquid crystal (PDLC) (or in plane switching LCD) may be used to induce a discontinuity in the refractive index. PDLC includes liquid crystal droplets that are dispersed in a solid polymer matrix. By modification of the orientation of selected liquid crystal molecules with an electric field, the material may be in either a generally diffusion state or a generally transparent state. In the diffusion state, the diffused light no longer satisfies the TIR condition, and light is steered out. In the transparent state, the diffused light satisfied the TIR condition, and the light is not steered out. Accordingly, light is permitted to escape through the associated pixel at selected locations. The duration of the change controls the state of the material. At any given pixel, this duration determines the relative intensity of the associated pixel, sub-pixel, and/or color. Other materials may likewise be used that include the ability to apply an electrical signal thereto and change the state of the material, such as between a state that is generally TIR and a state that is generally TFIR.

The use of a two dimensional area active backlight may enable one or more of the following advantages:
1. Increase in the contrast with reduced black level;
2. Reduced power consumption;
3. Motion blur reduction with backlight flashing; and
4. Wide color gamut with the use RGB backlight, and maintaining the size of the color gamut at reduced brightness.

Two dimensional area active backlights may use a large number of driving circuits. For an example, a backlight with 48×24×3 backlight elements may use 3456 drivers. The more backlight elements may result in more non-uniformity that may be combined with photo sensor circuits to compensate for the non-uniformity.

Figure 8:
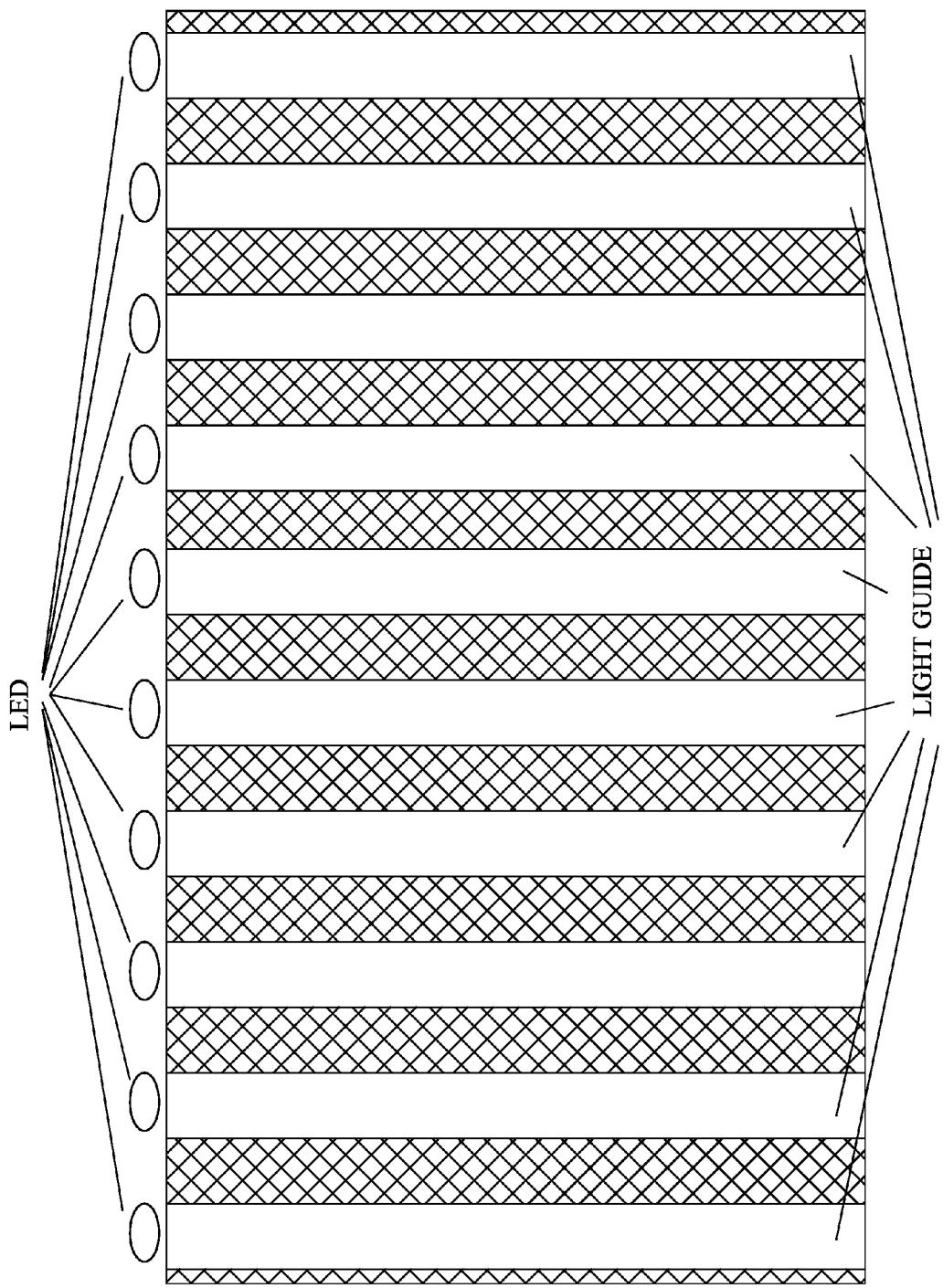
FIG. 8 illustrates an LCD backlight with 1D linear optical waveguides.

One technique to reduce the number of backlight elements ("BLEs") is to use a one-dimensional linear backlight where each backlight element consists of one or more LEDs and an optical waveguide that extends across a part of or the whole display. FIG. 8 illustrates a backlight with ten one dimensional BLEs, each covering one vertical strip from top to bottom of the display. The use of a plurality of one dimensional BLEs reduces the number of drivers. Also, a plurality of one-dimensional BLEs makes it easier to monitor and compensate for non-uniform light output of the BLEs to achieve improved spatial uniformity and color consistency.

Figure 9:
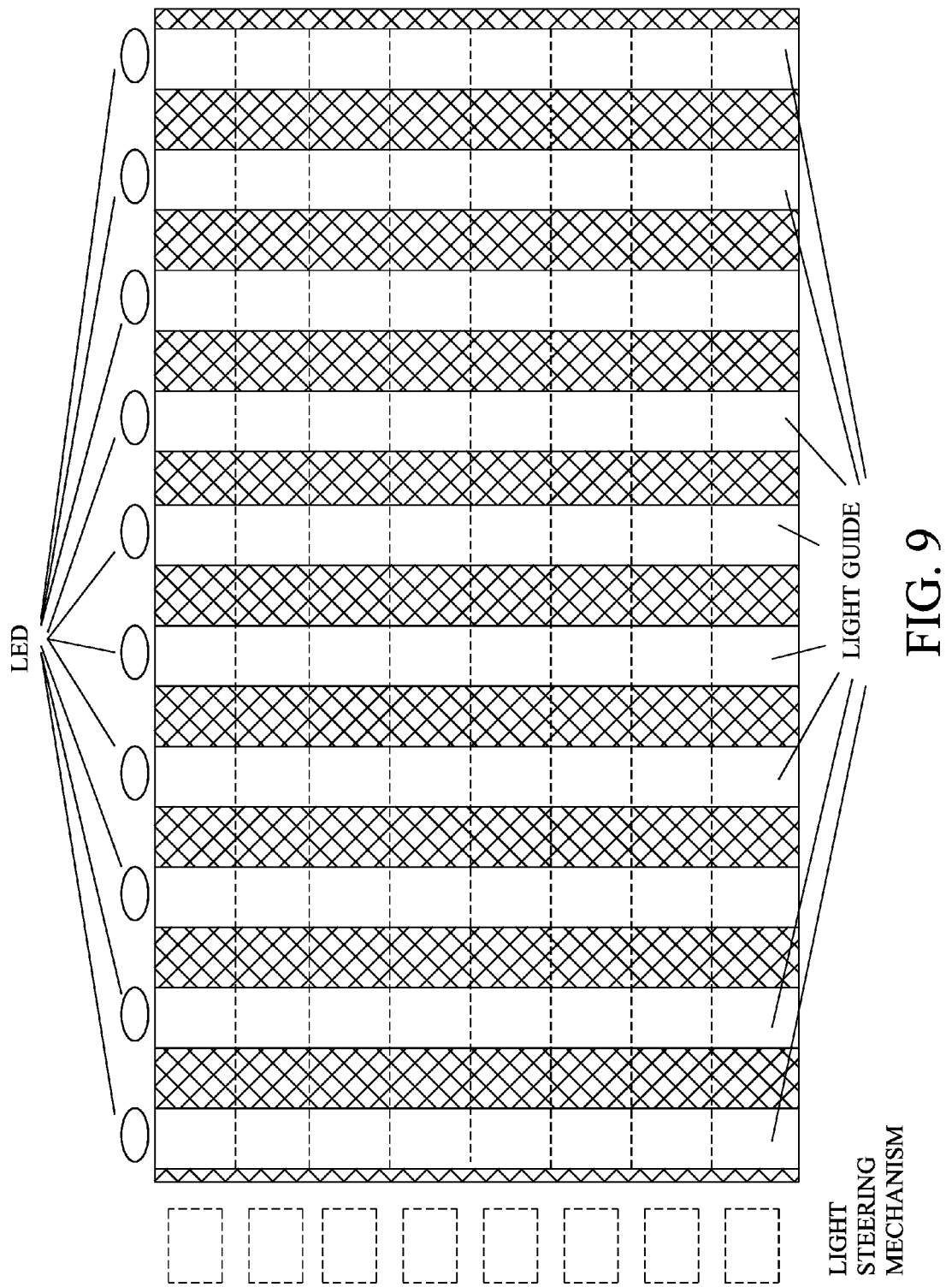
FIG. 9 illustrates an LCD backlight consisting of 1D backlight elements.

To achieve two-dimensional functionality with a set of one-dimensional light sources, a light steering technique may be used to actively extract light to enable a two-dimensional area active backlight from one-dimensional linear or point light sources. The light from the LED or other light source is coupled into the optical waveguide, but the light output from selected regions, such as that of one or more sets of pixels, is scanned from top to bottom (or any other suitable addressing mechanism). For an example, a steering mechanism may steer the light output from the top to the bottom as shown in FIG. 9. When one of the steering devices is activated, the associated horizontal row in the optical waveguide is open for light extraction; light is extracted from that row only and the other areas remains black. The activated light steering device may be de-activated and another light steering device is activated. The associated horizontal row of the new activated light steering device results in the optical waveguide being open for light extraction for that row while the other areas remains black. This process may be repeated for each light steering mechanism, preferably in a sequential manner. More than one light steering mechanism may be simultaneously selected, if desired. One or more of the light steering mechanisms may be selected multiple times while presenting an image, if desired. The display may have light guides that extend over only a part of the width of the display, thus requiring multiple light guides to cover the width of the display, if desired. This light steering with the temporal multiplexed driving results in a two dimensional area active backlight using a one-dimensional waveguide.

The steering mechanism may be achieved mechanically with a controllable shutter that is similar to the window shutter. Each of the light steering units consists of a motorized shutter. When a row is selected for light output, the motor opens the shutter to allow light output for that horizontal row, then closes, and the next row shutter opens and so on. Although mechanical shutters may be used, this may pose noise or life time issues. An electrical field based steering mechanism based on the properties of the material, such as shown in FIG. 6 is preferred. This reduces noise issued and life time issues.

Figure 10:
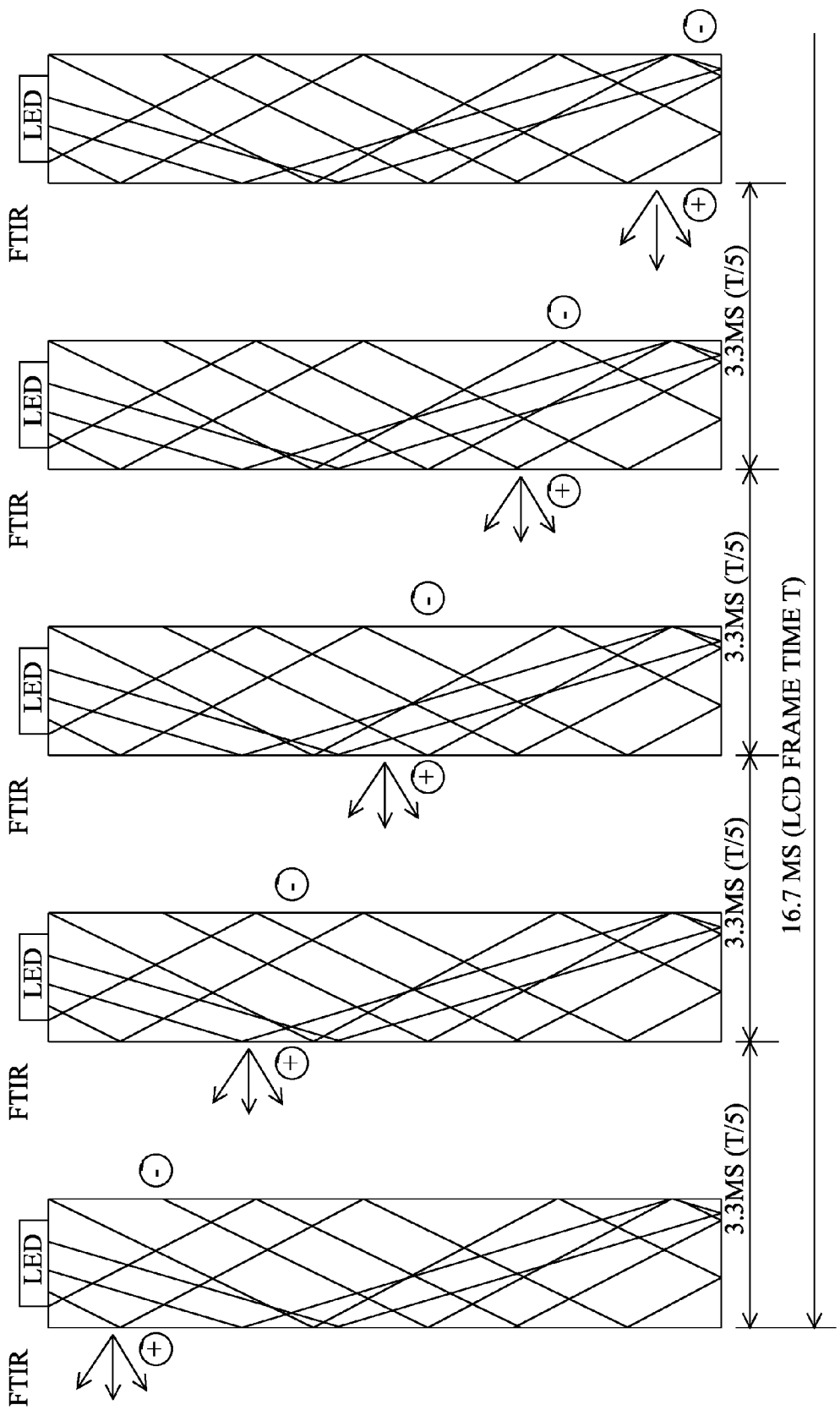
FIG. 10 illustrates light steering using electrostatic FTIR.

As shown in FIG. 9, the optical waveguide may be arranged vertically across the display. The light output from the waveguide may be synchronized with LCD driving, which is normally done from top to bottom, one line at a time. The light is steered out at the top, then next row, until it reaches the bottom, and then the process is repeated. FIG. 10 illustrates the light steering sequence for a backlight with 5 steerable segments. At the start of a frame, the first (top in the figure) row is selected for light output. The LED output intensity, or the pulse width modulation (PWM) width, or both the intensity and the PWM width are modulated based on the desired backlight for that position. All the other areas are black. At $\frac{1}{5}^{th}$ the frame period (3.3 ms), the first row is de-selected, and the $2^{nd}$ row is selected so that FTIR occurs for the second row. The LED driving values corresponding to the second row are loaded in the LED drivers and all the LED light illuminates the area corresponding the $2^{nd}$ row. The process is repeated for the $3^{rd}$, $4^{th}$ and $5^{th}$ rows to complete one LCD frame. Alternatively, the functions of the LEDs and the light steering may be reversed, if desired.

One advantage of this temporal multiplexed driving is the reduced temporal aperture which reduces the motion blur. Each steerable row is "on" for only a fraction of the temporal period, making it an impulse display that can achieve blur reduced rendering of a motion sequence.

The above light steering can be applied for a point light source such as a laser with two dimensional steering. The light is first coupled to a two dimensional waveguide with M (horizontal)×N (vertical) steerable backlight elements. The light output is scanned from top to bottom and left to right as it is done in a CRT display.

While such a 2D area active backlight is beneficial, it is desirable to optimally select the temporal timing of the light source illumination together with spatial location of the light source for a particular pixel for improved image quality. To achieve such improved image quality, it is desirable to characterize the spatio-temporal characteristics of the display.

The following parameters are suitable to characterize the temporal aspects of a liquid crystal display:

(1) The LCD frame cycle time is typically T=16.67 ms.

(2) The rise time from 10% to 90% (excluding leakage) for a polymer network liquid crystal (PNLC) is typically Tr1090=0.6 ms.

(3) The fall time from 90% to 10% (excluding leakage) for a polymer network liquid crystal (PNLC) is typically Tf9010=2 ms.

(4) The switch ON time with respect to the beginning of a sub-frame is typically t1=0 ms.

(5) The switch OFF time with respect to the end of a sub-frame is typically t2=0 ms.

(6) The number of polymer network liquid crystal (PNLC) segments in each waveguide may be mBlocks=5.

(7) The number of output levels for the backlight, such as a light emitting diode, may be LED_levels=64.

(8) The number of fields, such as for a light emitting diode, within a liquid crystal frame cycle time may be LED_fields=512.

(9) The polymer network liquid crystal (PNLC) scattering ratio between the OFF state and the ON state may be leakage=0.05.

Figure 11:
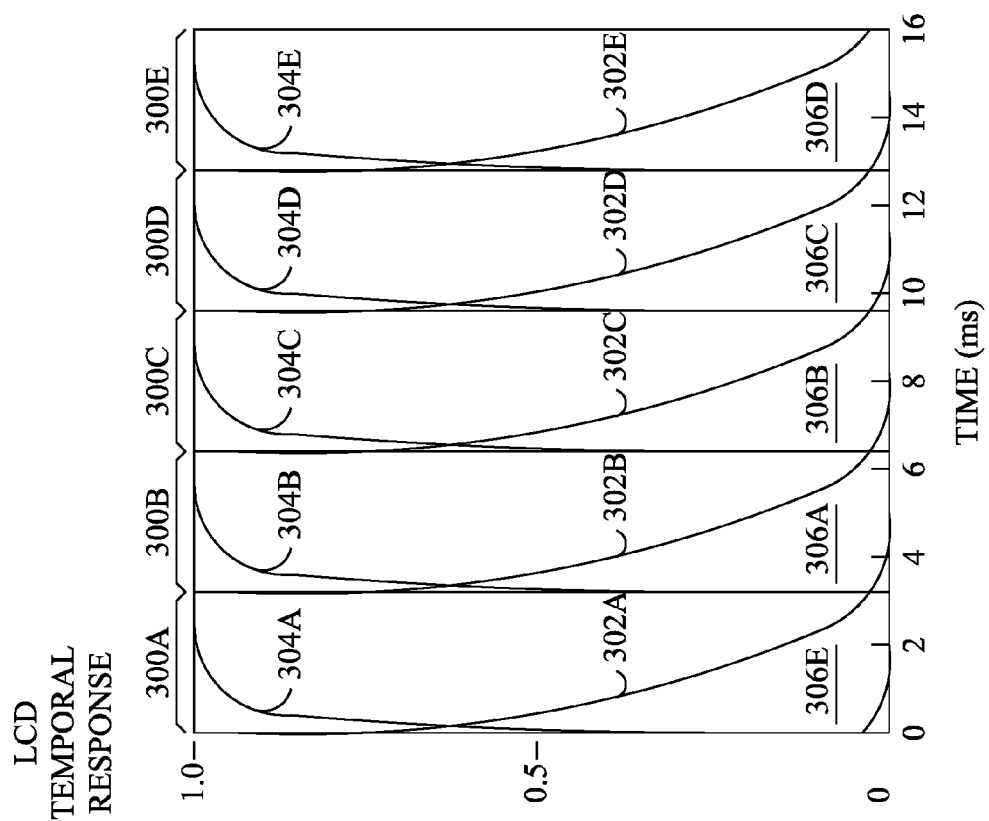
FIG. 11 illustrates an LCD temporal response.

Referring to FIG. 11, the temporal behavior of a liquid crystal cell of the display is illustrated, based upon the exemplary parameters above. As illustrated, there are 5 segments (mBlocks=5) 300A, 300B, 300C, 300D, and 300E of the display over the LCD frame cycle time of 16.67 ms (T=16.67 ms). The fall time (Tf9010=2 ms) for each of the 5 segments 300A-300E is illustrated by the falling curves 302A, 302B, 302C, 302D, and 302E. The rise time (Tr1090=0.6 ms) for each of the 5 segments 300A-300E is illustrated by the rising curves 304A, 304B, 304C, 304D, and 304E. As it may be observed, each of the falling curves 302A-302E includes a significant overlapping region 306A, 306B, 306C, 306D, and 306E with a next adjacent segment which leads to undesirable crosstalk.

Figure 12:
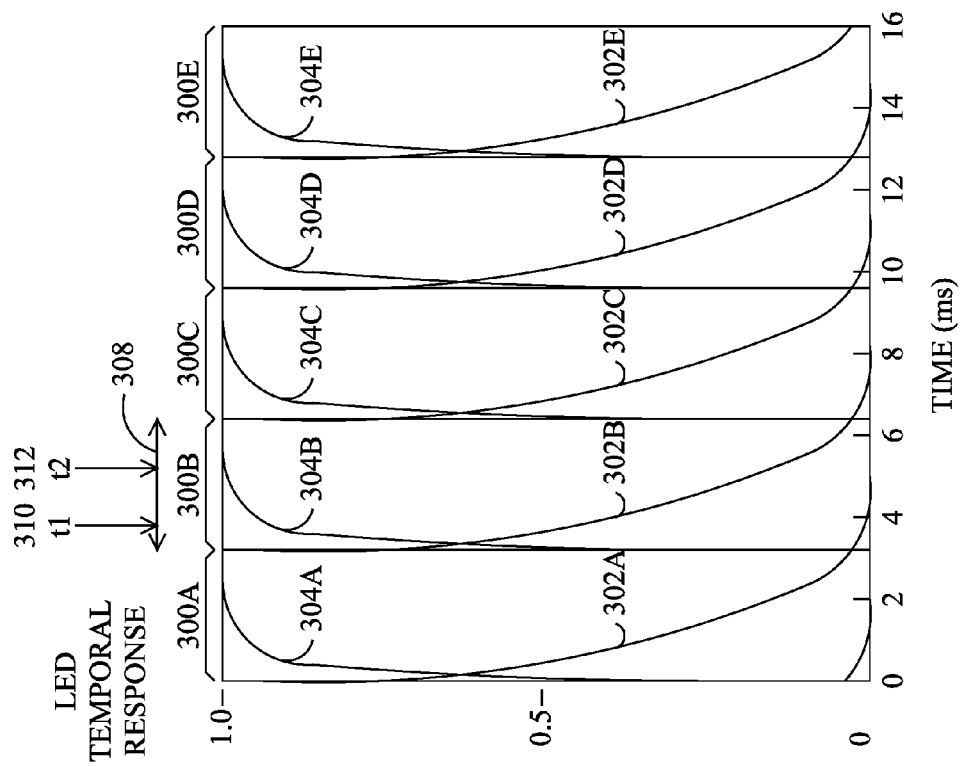
FIG. 12 illustrates an LED temporal response.

Referring to FIG. 12, the temporal behavior of a light emitting diode of the display is illustrated, based upon the sample parameters above. As illustrated, there are 5 segments (mBlocks=5) 300A, 300B, 300C, 300D, and 300E of the display over the LCD frame cycle time of 16.67 ms (T=16.67 ms). The fall time (Tf9010=2 ms) for each of the 5 segments 300A-300E is illustrated by the falling curves 302A, 302B, 302C, 302D, and 302E. The rise time (Tr1090=0.6 ms) for each of the 5 segments 300A-300E is illustrated by the rising curves 304A, 304B, 304C, 304D, and 304E. During each of the 5 segments 300A-300E the associated light emitting diode will be turned "ON" for a fraction of, or all of, the duration of the segment, and then turned "OFF". For example, with 5 segments, the duration that the light emitting diode is "ON" during each segment will be one fifth or less of the total duration of the LCD frame cycle time. In some cases, the duration that the light emitting diode is "ON" is significantly less to reduce motion blur. The duration of the illumination of the backlight may be less than the duration of the segment, such as turning "ON" at a time $t_1$ and turning off at a time $t_2$. The selection of $t_1$ 310 and $t_2$ 312 may be selected such that it generally maximizes the overlap with the liquid crystal response of the associated segment while generally minimizes the overlap with the liquid crystal responses of other segments. This assists in reducing the crosstalk between segments.

Once the positions of the light emitting diode temporal windows are selected, and assuming the output level equals one when the light emitting diode is ON during a temporal window, the output level for the other duty cycles may be determined. When $t_1$ 310 is larger than $t_2$ 312, the light emitting diode is not turned on (duty cycle is zero) and the output level is zero. For all such start and end times, one may calculate the overlap integral between the light emitting diode ON time and the temporal response of the liquid crystal layers, for all rows as follows:

$$S_i = \int_T \text{LED}_{ON}(t) \cdot LC_{ith\,row}(t) dt$$

One may renormalized so that the segments that correspond with the light emitting diode widow have an overlap integral equal to one. One may then calculate the sum of all of the segments, i.e., the sum of the overlap integrals) $\Sigma_i S_i$ for the light emitting diode ON time with all the liquid crystal temporal responses. A value of one for the sum of the segments corresponds to the case where there is no crosstalk. Values larger than one correspond to larger crosstalk. The sum of the segments provides a measure of the point spread function (PSF), which is desirable to be reduced.

Figure 13:
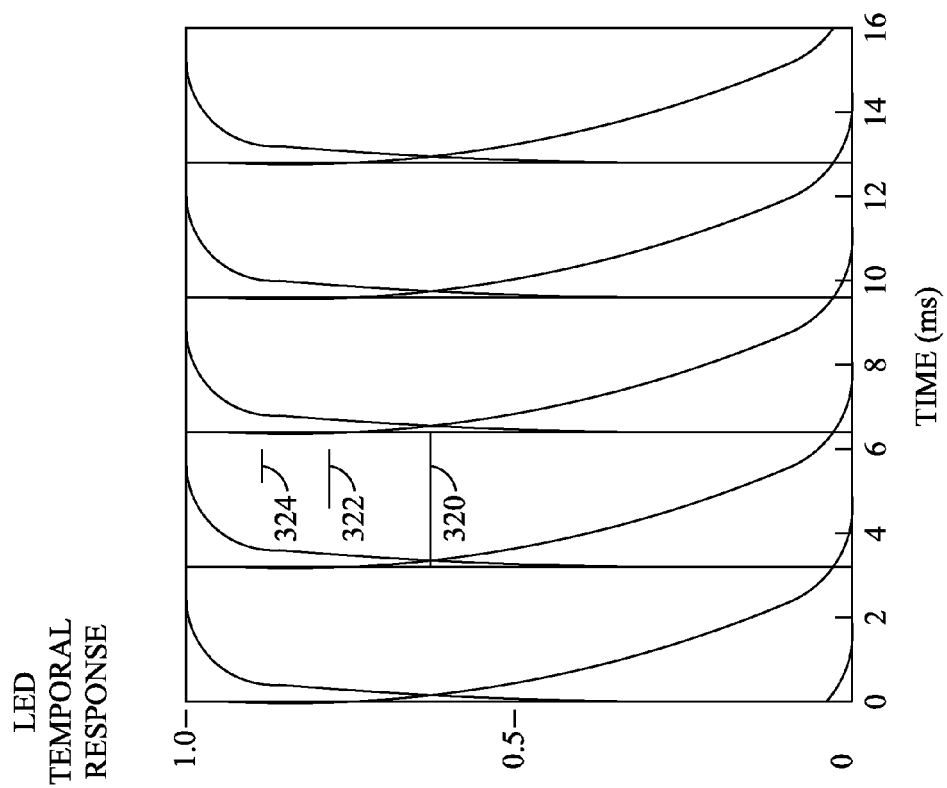
FIG. 13 illustrates an LED temporal response for an optimal path.

To create a look up table (LUT) for selecting the backlight values, it is desirable to have output levels that uniformly sample the interval [0,1], while reducing the point spread function (sum of the segments). This may be determined by finding the values $t_1$ 310 and $t_2$ 312 with the smallest point spread function. One exemplary set of optimal paths for the duty cycles are illustrated in FIG. 13.

For the light emitting diode time indicated by 320, the light emitting diode is ON for almost the entire duration of the corresponding window, with the output level being close to one during this time. During this time there is a significant amount of crosstalk due to the overlap in the temporal response.

For the light emitting diode time indicated by 322, the light emitting diode is ON for approximately half of the entire duration of the corresponding window, with the output level being close to one and offset toward the end of the window to reduce the crosstalk due to the crosstalk in the temporal response.

For the light emitting diode time indicated by 324, the light emitting diode is ON for a relatively small fraction of the entire duration of the corresponding window, with the output level being close to one and offset toward the end of the window with insignificant crosstalk due to the crosstalk in the temporal response.

This crosstalk information may be stored in a look up table, $n \to t_1, t_2$, where n goes from one to the number of light emitting diode output levels thereby providing a temporal characterization of the display, where the segments are presumed to be uniform.

Figure 14:
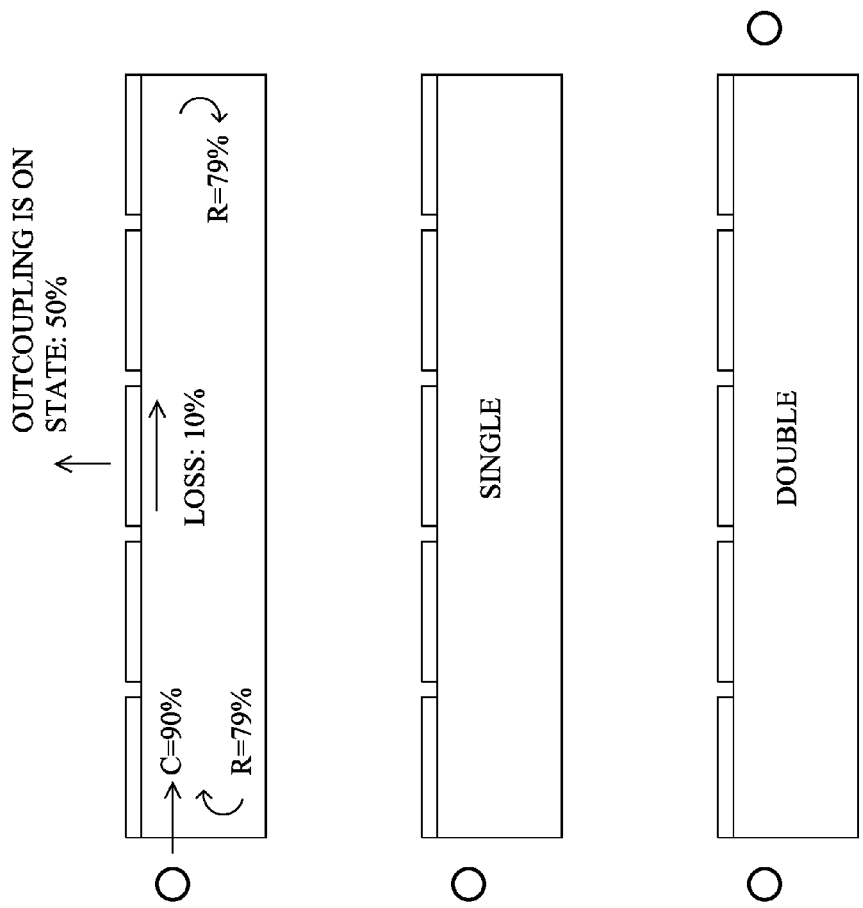
FIG. 14 illustrates spatial parameters.

Referring to FIG. 14, the spatial characteristics of the display may be characterized with the following parameters:

(1) The loss for each segment (excluding scattering) may be loss=0.1.

(2) The scattering for each segment in the ON state (excluding loss) may be scat=0.5.

(3) The reflection efficiency at the end of the waveguide may be R1=0.79.

(4) The reflection efficiency at the beginning of the waveguide may be R2=0.79.

(5) The "in coupling" efficiency may be C=0.904.

(6) The illumination of the waveguide may be single sided, or double sided.

The light intensity in the backlight waveguide $I_{wg}$ may be considered to decay exponentially as follows: $I_{wg} = I_O \exp[-(\alpha+\gamma)z]$.

$I_O$ may be defined as the intensity at the beginning of the waveguide, $\alpha$ as the coefficient that determines scattering out of the waveguide, $\gamma$ as the loss coefficient (due to material loss in "transparent" electrodes), and z as the longitudinal direction of the waveguide. A radiance R, which is generally a measure of the spatial luminance distribution of light, may be a function of position and (for forward propagation) may be generally proportional to:

$$\frac{\alpha}{\alpha+\gamma}\frac{dI_{wg}}{dz}.$$

One may assume that the scattering coefficient $\alpha$ is proportional to the PNLC/PDLC response. Since this response varies over time, the scattering will likewise vary over time. There is more scattering in the ON state than in the OFF state, but also, the transition between the ON and OFF state is not instantaneous. Thus taking this into account by discretizing the time, and doing the determination at each instant, one may calculate the decay of the intensity in the waveguide, and from this derive the spatial radiance over the entire waveguide. One may also average the spatial radiance over one frame cycle to obtain the perceived spatial radiance. This corresponds to what is perceived by the human eye, namely, it averages over time attenuating the high frequency components. This may be performed for each of the segments, as desired.

This spatial information may be stored in a look up table, block, n→R(z), efficiency, where n goes from 1 to the number of light emitting diode output levels and block is the number of the segment. The total efficiency for a light emitting diode level and the segment may be calculated by comparing the duty cycle to the radiance over the entire waveguide.

The point spread function for a display may likewise be characterized by spatial and temporal parameters. Alternatively, the point spread function for a display may be characterized by measurements made from a display. In either case, the resulting parameters may be stored in a look up table. Moreover, the position of the light emitting diode window may be empirically optimized for each output level through a search and measurement technique of a display.

Figure 15:
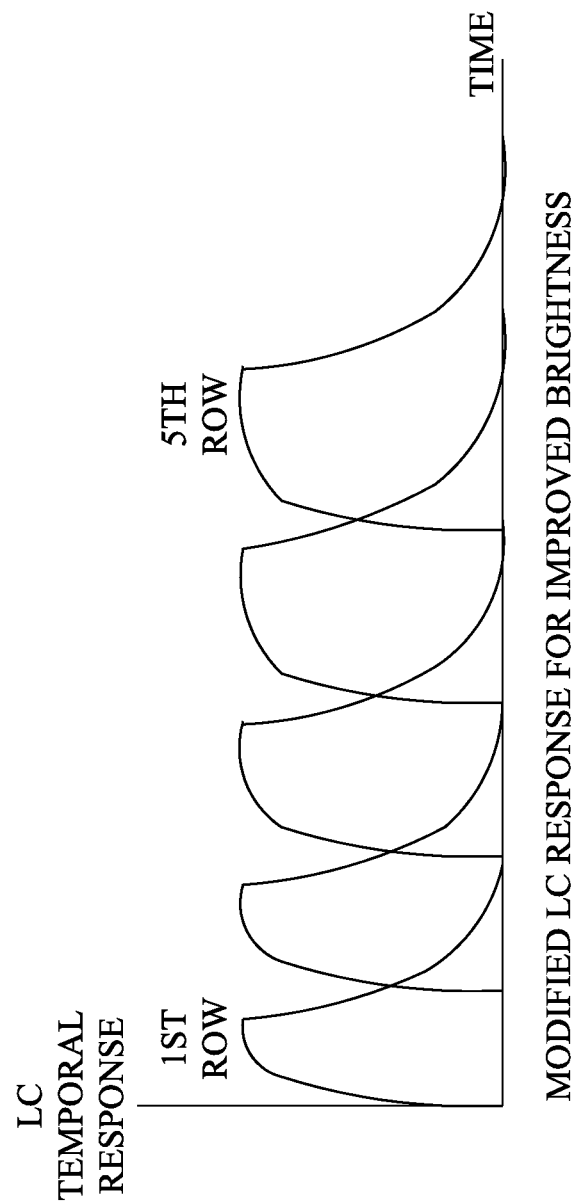
FIG. 15 illustrates a modified liquid crystal response for optimal brightness.

Referring to FIG. 15, in the presence of loss, such as is the case where the light emitting diode is coupled in from one side one, a segment further from the light source does not attain the same brightness as a segment closer to the light source. The temporal response for the rows may be modified to compensate for the fact that segments further from the light source have more losses in the waveguide. The temporal response modification may include providing a longer temporal window for rows further from the light source. In the case of light emitting diodes that are coupled in from both sides, the central region may tend to have a longer temporal window than the edges.

Figure 16:
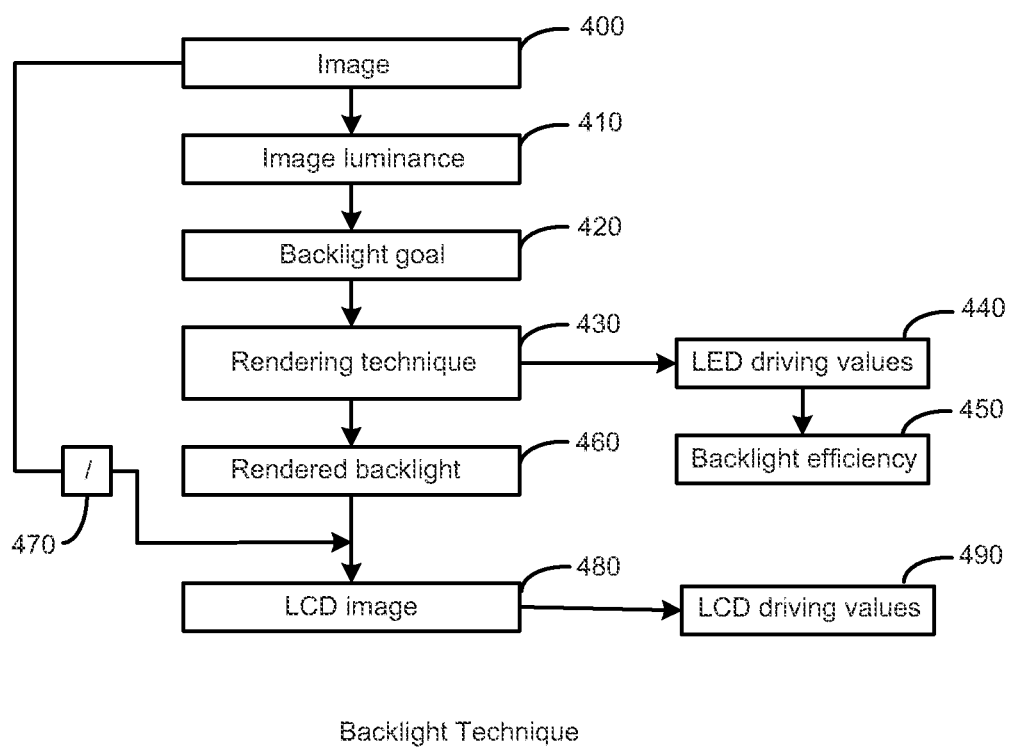
FIG. 16 illustrates a backlight technique.

FIG. 16 illustrates an exemplary rendering technique that receives an image 400, and preferably a high dynamic range image. Based upon receiving the image 400, the image luminance 410 is determined for the pixel values. The rendering technique includes a backlight goal 420 that characterizes the desired backlight. In most cases, the individual elements of the backlight are at a significantly lower resolution than the individual elements of the liquid crystal layer. Accordingly, for each region of the backlight, a suitable backlight level is determined based upon the corresponding image luminance 410. By way of example, the backlight for each region may correspond with the spatially corresponding lowest luminance level of the image luminance 410. A rendering technique 430 may receive the backlight goal 420 to suitably select the luminance duration and/or temporal timing of the luminance and/or luminance level of the backlight, together with suitable spatial modifications.

The rendering technique 430 may provide LED driving values 440 which are used to also determine backlight efficiency 450. The rendering technique 430 may likewise provide LED driving values 440 to determine an anticipated rendered backlight 460. The rendered backlight 460 is divided 470 by the image luminance 410 which provides the corresponding LCD image 480. The LCD image may be used to determine suitable LCD driving values 490. In this manner, the combination of the luminance from the backlight and the transmission of light though the LCD layer, results in presenting the desired image 400.

Figure 17:
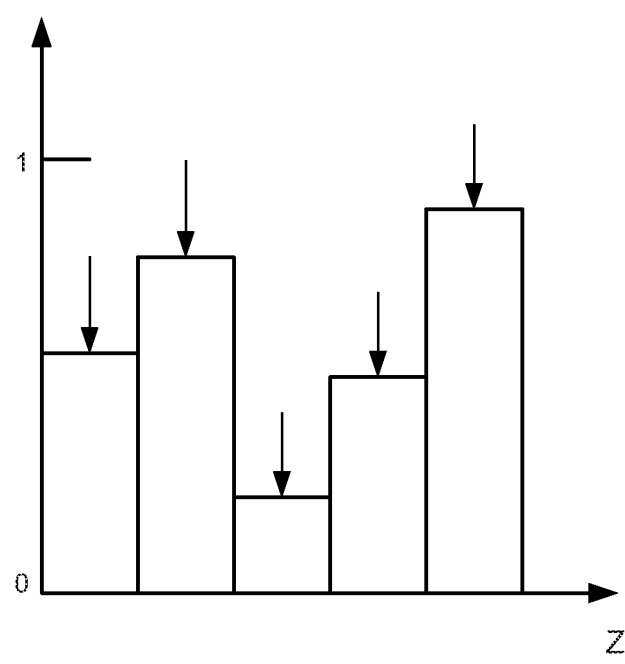
FIG. 17 illustrates a backlight goal and position.

Referring to FIG. 17, an exemplary backlight goal may include a different goal for one or more of the segments. The spatial radiance may be characterized in the look up table for the backlight. In addition to the values for the backlight goal (such as between zero and one), one may also specify where the backlight is to be matched, as indicated by the arrows. Preferably, the selection is in the center of each segment, but it may be modified, as desired. This indication of where the backlight is to be matched is used in conjunction with the spatial radiance which also varies as a function of position within each segment, and therefore generally a preferable characterization may be achieved at one position in the segment.

Figure 18:
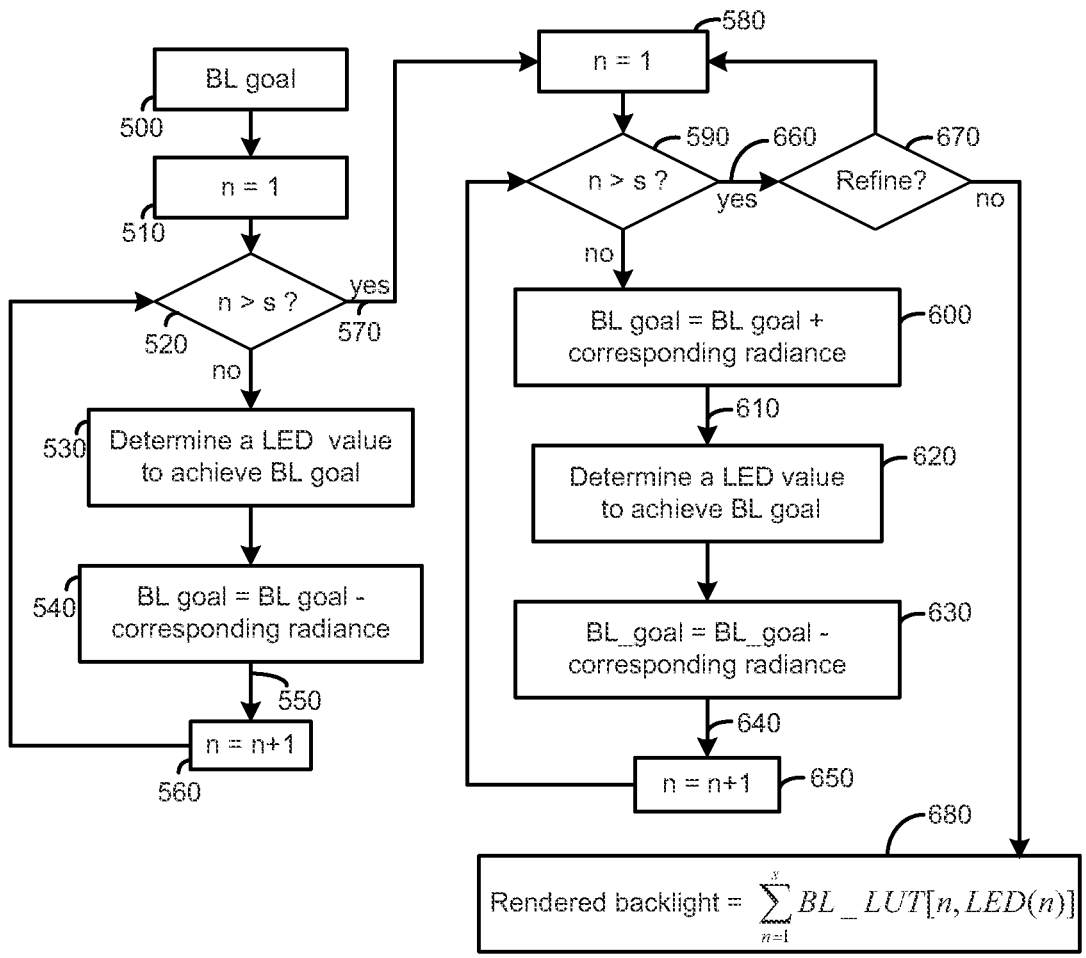
FIG. 18 illustrates a backlight rendering technique.

Referring to FIG. 18, the backlight determination technique may progress sequentially from segment to segment. A backlight goal 500 is selected and/or received (such as from Backlight Goal 420, see FIG. 16) and a counter n is set to one 510. If n is not greater than s 520, which is set to the number of segments, then the system determines a LED level to achieve the backlight goal 530. The LED value 530 may be determined in an appropriate manner, such as using a formula calculation or a look up table. The backlight goal may be modified by subtracting the corresponding spatial radiance to that backlight input level at the positions to be matched 540. This selects an appropriate backlight level for the particular segment 550, and then n is incremented 560 for the next segment by n=n+1. The process is repeated for each of the segments until n>s 570.

A further refinement process may be performed, if desired, by resetting the counter n to one 580, preferably on a segment by segment basis. If n is not greater than s 590, which is set to the number of segments, then the system adds the spatial radiance for the previously established input level 600 for the segment with the other segments remaining the same. This provides a new backlight goal 610. With the new backlight goal 610, the system may determine a LED level to achieve the backlight goal 620, such as based upon other anticipated resulting backlight levels as previously modified. The LED value 620 may be determined in an appropriate manner, such as using a formula calculation or a look up table. The backlight goal may be modified by subtracting the corresponding spatial radiance from the backlight input level for the segment at the positions to be matched 630. This selects a refined backlight level for the particular segment 640, and then n is incremented 650 for the next segment by n=n+1. The process is repeated for each of the segments n until n>s 660. Then the system determines if the process should be further refined 670. When the process is sufficiently refined the backlight is rendered 680.

The particular order in which the segments are determined may be selected, as appropriate. The backlight goal may further be rescaled to increase performance. Generally, increasing the backlight goal gives better image quality at the cost of power efficiency. Generally, reducing the backlight goal improves power efficiency at the expense of image quality, with the brightest parts of the original image being rendered less bright. Also, a convolution over the width of the entire backlight may be performed to determine a rendered backlight for the entire screen. Once the rendered backlight is determined, the front liquid crystal display values are determined.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A display comprising:
   (a) a liquid crystal layer;
   (b) a backlight that provides light to said liquid crystal layer;
   (c) said liquid crystal layer selectively modifying the transmission of light from said backlight to the front of said display;
   (d) said backlight includes a plurality of spaced apart light waveguides;
   (e) said display includes a plurality of selection elements associated with said light waveguides that change the characteristics of the material of said light waveguides to selectively direct the transmission of light toward said liquid crystal layer;
   (f) a light steering device that uses a lookup table to reduce crosstalk between portions of said display respectively associated with said light waveguides, and by steering light through the combination of said waveguides and said selection elements to provide light to said front of said display in a non-uniform temporal manner during temporal time periods presenting a single picture across the entire said display for a frame and a non-uniform spatial manner during said frame presenting said picture, where said non-uniform temporal manner and said non-uniform spatial manner are respectively controlled by said light steering device to achieve said reduced crosstalk, and where said lookup table is based on measured crosstalk characteristics of said display.

2. The display of claim 1 wherein said plurality of said waveguides are arranged in a parallel arrangement with respect to one another.

3. The display of claim 2 further including a light steering mechanism that selectively directs light to at least one, and less than all, of said light waveguides at any particular time.

4. The display of claim 3 wherein at least one of said selection elements is associated with a respective one of said plurality of waveguides.

5. The display of claim 4 wherein for a respective one of said plurality of waveguides that light is only substantially emitted from said respective guide at a position associated with a selected respective one of said selection elements.

6. The display of claim 5 wherein said combination results in a temporal multiplexed illumination of said display.

7. The display of claim 1 wherein said backlight includes a plurality of light emitting diodes that provides light to respective said waveguides.

8. The display of claim 1 wherein said selection elements use frustrated total internal reflection.

9. The display of claim 1 wherein a plurality of said waveguides extend across the entire said display.

10. The display of claim 1 wherein said non-uniform spatial manner is based upon a spatial radiance of the overall display.

11. The display of claim 1 wherein said non-uniform spatial manner is further based upon display efficiency of the overall display.

12. The display of claim 1 wherein said non-uniform spatial manner is modified in accordance with a perceived spatial radiance of the overall display.

13. The display of claim 1 wherein said non-uniform temporal manner is based upon a variable temporal sub-time period of said frame.

14. The display of claim 13 wherein said non-uniform spatial manner illuminates different spatial regions of said display during different said temporal time periods.

15. The display of claim 14 wherein said different relative time periods are non-overlapping.

16. The display of claim 14 wherein said variable sub-frame window is selected based upon a look up table.

17. The display of claim 1 wherein said non-uniform temporal manner is selected to generally maximize illumination from said display while generally minimizing crosstalk of said display.

18. The display of claim 1 wherein the timing of said non-uniform temporal manner is based upon the temporal response of the materials of said display.

* * * * *